United States Patent [19]

Sugawara

[11] Patent Number: 5,052,787

[45] Date of Patent: Oct. 1, 1991

[54] ZOOM FINDER

[75] Inventor: Saburo Sugawara, Kanagawa, Japan

[73] Assignee: Asahi Kogaku Kogyo K.K., Tokyo, Japan

[21] Appl. No.: 667,369

[22] Filed: Mar. 12, 1991

Related U.S. Application Data

[63] Continuation of Ser. No. 426,371, Oct. 25, 1989, abandoned.

[30] Foreign Application Priority Data

Oct. 26, 1988 [JP] Japan ................. 63-270384

[51] Int. Cl.[5] ............... G02B 15/14; G02B 13/18; G03B 13/02; G03B 13/10
[52] U.S. Cl. ................. 359/683; 354/219; 354/222; 354/225; 359/708
[58] Field of Search ........... 350/423, 427, 432–435; 354/219, 222, 225

[56] References Cited

U.S. PATENT DOCUMENTS 4,834,513  5/1989  Nozawa .................. 350/432 X

FOREIGN PATENT DOCUMENTS 1126729   3/1962  Fed. Rep. of Germany .
61-87122  5/1986  Japan .
61-156019 7/1986  Japan .
63-52114  3/1988  Japan .

*Primary Examiner*—Scott J. Sugarman
*Attorney, Agent, or Firm*—Sughrue, Mion, Zinn, Macpeak & Seas

[57] ABSTRACT

A zoom finder can be provided which ensures high magnification and satisfactory view-finding without the need to increase the size. A positive lens which is movable along the optical axis is provided closest to the object side. A negative lens which is movable along the optical axis is provided on the eye-side of the positive lens. Zooming may be accomplished by the zoom finder by moving these lenses along the optical axis. A third lens is provided on the eye-side of the negative lens. The third lens is a negative lens which is fixed and has an eye-side surface which serves as a half-mirror. On the other side of this third lens is a parallel planar plate having an optical frame on one surface which indicates the imaging range. The parallel planar plate may be moved in a direction perpendicular to the optical axis in order to compensate for parallax. A fourth lens which is a fixed positive lens is closest to the eye-side.

11 Claims, 6 Drawing Sheets

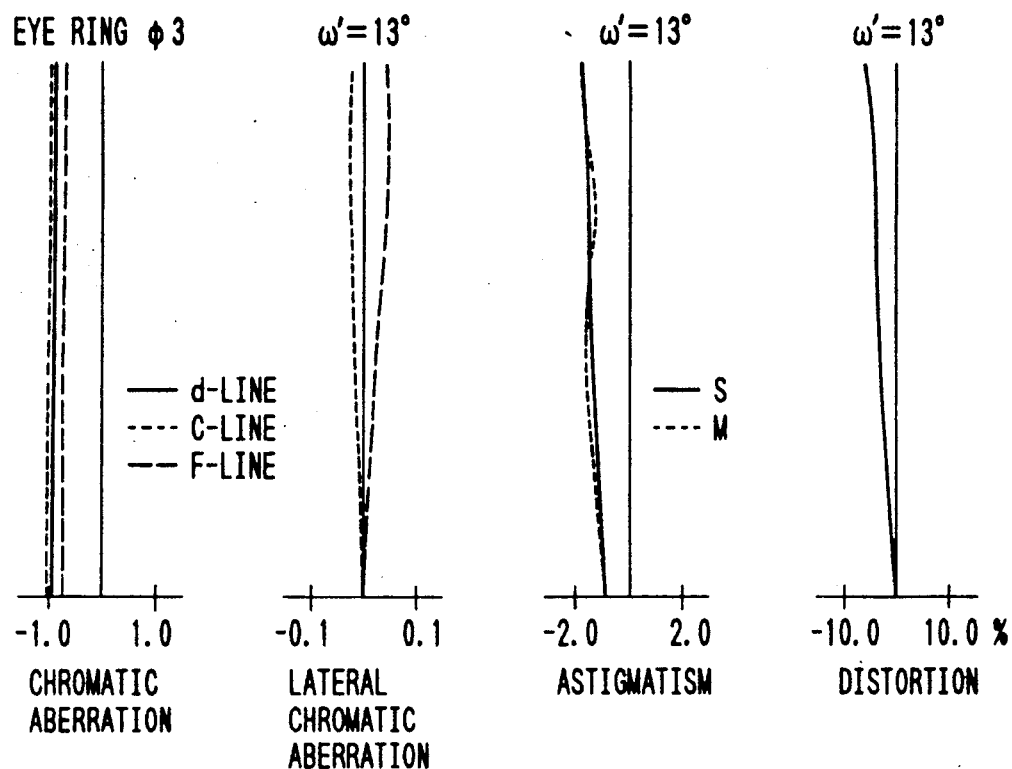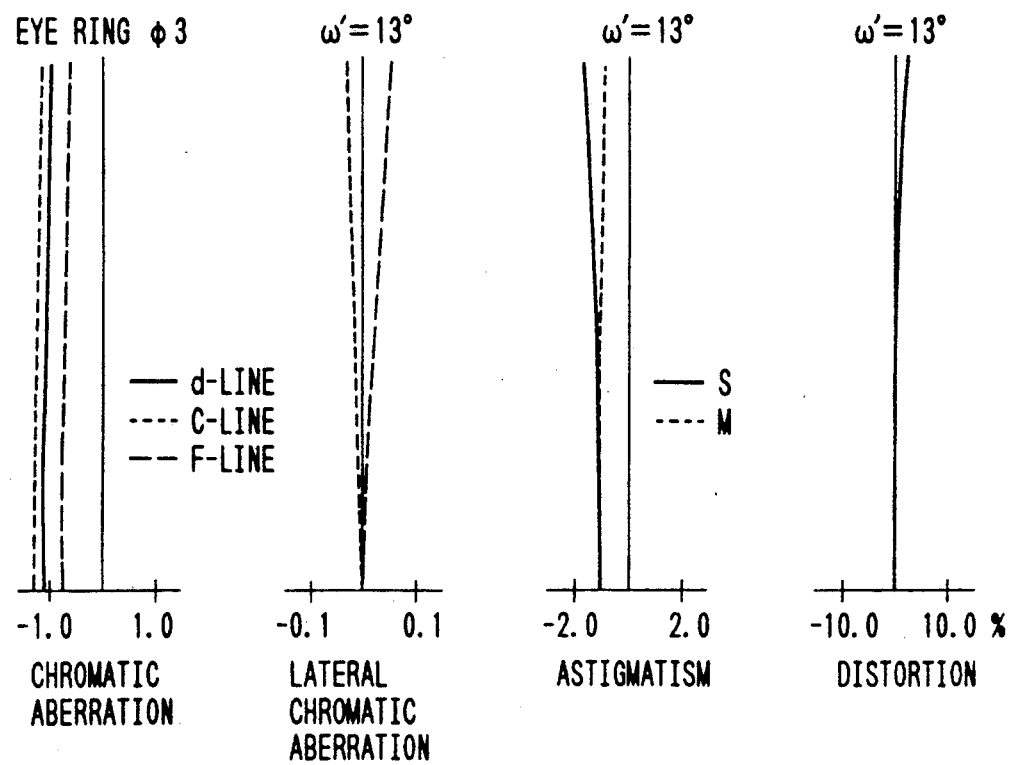

ZOOM FINDER

This is a continuation of application Ser. No. 07,426,371 filed Oct. 25, 1989, now abandoned.

BACKGROUND OF THE INVENTION

The present invention relates to a zoom finder for use with cameras, and more particularly to a zoom finder which has a leaf-shutter, is compact and provides high magnification.

Modern "leaf-shutter" cameras have a zoom lens built into the imaging lens system. This has given rise to the need for adopting a zoom finder in the view-finding optical system. Zoom finders of this type that have been previously known in the art consist of three lens groups having a positive, negative and positive refractive power in order from the object side, with the negative lens group being moved along the optical axis to effect zooming. Examples of this sort of zoom finder may be found in Japanese Unexamined Published Patent Application Nos. 61-87122 and 63-52114.

These conventional zoom finders, however, have had the problem that the magnification which they provide is so low that the object is made to appear very small in the visual field.

SUMMARY OF THE INVENTION

The present invention has been accomplished in order to solve the problem of the conventional zoom finders set forth above. Its principal object is to provide a zoom finder that ensures high magnification and satisfactory view-finding without the need for increasing its size.

The object of the present invention set forth above can be attained by a zoom finder which comprises, in order from the object side, a positive first lens movable along the optical axis, a negative second lens movable along the optical axis, a negative third lens with its eye-side surface serving as a half mirror, a parallel planar plate which is movable in a direction perpendicular to the optical axis and which has an optical frame on one surface that indicates the imaging range, and a positive fourth lens. This zoom finder effects zooming by moving the first and second lenses along the optical axis and compensates for parallax by moving the parallel planar plate in a direction perpendicular to the optical axis. This zoom finder further satisfies the following conditions:

$$0.5 < f_1/LDt < 1.5 \quad (1)$$

$$0.1 < |f_2|/LDt < 0.7 \quad (2)$$

$$R2 < 0 \quad (3)$$

$$R3 < 0 \quad (4)$$

$$0.1 < R3/R2 < 0.9 \quad (5)$$

where:
 $f_1$ is the focal length of the first lens;
 $f_2$ is the focal length of the second lens;
 LDt is the overall lens length under a narrow visual field and a high magnification condition;
 R2 is the paraxial radius of curvature of the second surface; and
 R3 is the paraxial radius of curvature of the third surface.

Each of the lenses in the zoom finder of the present invention is a single lens element, with the third and fourth lenses being fixed. The zoom finder of the present invention preferably uses aspheric lenses.

In a preferred embodiment, the third surface from the object side (i.e., the surface of the second lens which is on the object side) satisfies the following condition:

$$0.003 < \Delta X_3(0.2LDt)/Ldt < 0.05 \quad (6)$$

where $\Delta X$ is the amount of displacement of the aspheric surface, and the geometry of the aspheric third surface is given by:

$$\Delta X \alpha(H) = \frac{H^2/R}{1 + \sqrt{1 - (K+1) \cdot H^2/R^2}} + \sum_{i=2}^{5} A_{2i} \cdot H^{2i} - \frac{H^2/R}{1 + \sqrt{1 - H^2/R^2}}$$

where:
 $\alpha$ is a subscript designating a refractive surface;
 H is the height from the optical axis;
 K is the coefficient of a second-order curved surface;
 R is a paraxial radius of curvature; and
 $A_{2i}$ is the coefficient of a higher-order aspheric surface.

BRIEF DESCRIPTION OF THE DRAWINGS

Other features and advantages of the present invention will become apparent when viewed in connection with the drawings, wherein:

FIG. 4 is a graph plotting aberration curves for the zoom finder of FIG. 3;

FIG. 5 is a graph plotting aberration curves obtained with an Albada finder according to the first embodiment of the invention shown by Example 1;

DESCRIPTION OF THE PREFERRED EMBODIMENTS

Figure 1:
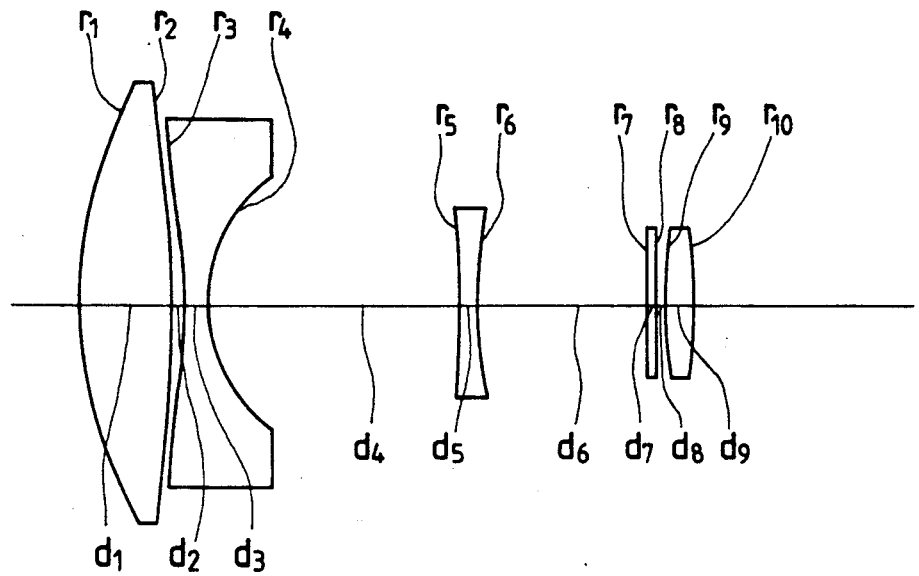
FIG. 1 shows a vertical section of a zoom finder according to a first embodiment of the present invention shown in Example 1, under wide visual field and low magnification conditions.

The lens construction of the present invention is described in the Summary section hereinabove. Conditions (1)–(5) set forth above must be satisfied by the present invention, while condition (6) is preferable but optional. Each of these conditions is described below.

Condition (1): $0.5 < f_1/LDt < 1.5$

Condition (1) relates to the ratio of the focal length of the first lens to the overall lens length under narrow visual field and high magnification conditions. If the lower limit of this condition is not reached, the power of the first lens increases and a high zoom ratio can be attained by a small movement of the first and second lenses, but it becomes difficult to compensate for coma and distortion. Conversely, if the upper limit of condition (1) is exceeded, the power of the first lens decreases to allow for easy compensation for coma and distortion, but a high zoom ratio cannot be attained without moving the first and second lenses by a great amount. This is also undesirable since the overall lens length increases.

Condition (2): $0.1 < |f_2|LDt < 0.7$

Condition (2) relates to the ratio of the focal length of the second lens to the overall lens length under narrow visual field and high magnification conditions. If the lower limit of this condition is not reached, the power of the second lens increases and a high zoom ratio can be attained by a small movement of the first and second lenses, but it becomes difficult to compensate for coma and distortion. Conversely, if the upper limit of condition (2) is exceeded, the power of the second lens decreases to allow for easy compensation for coma and distortion, but a high zoom ratio cannot be attained without moving the first and second lenses by a great amount. This is also undesirable since the overall lens length increases.

Conditions (3); (4): $R2<0$; $R3<0$

Conditions (3) and (4) relate to the values of paraxial radii of curvature of the second and third surfaces. If these conditions are not satisfied, the first and second lenses are unable to produce a large power and must be moved by a great amount in order to realize a high zoom ratio. This is undesirable since the overall lens length increases.

Condition (5): $0.1 < R3/R2 < 0.9$

Condition (5) relates to the ratio of the paraxial radius of curvature of the third surface to that of the second surface. If the lower limit of this condition is not reached, the shapes of the second and third surfaces differ so greatly that it becomes difficult to achieve effective compensation for coma when the field of view is narrow and the magnification is low. Conversely, if the upper limit of condition (5) is exceeded, not only do the powers of the first and second lenses decrease but also their shapes become similar to each other. Thus, coma can be easily compensated under a wide visual field and a low magnification condition. However, a high zoom ratio cannot be attained unless the first and second lenses are moved by a great amount.

Condition (6): $0.003 < \Delta X_3(0.2LDt)/LDt < 0.05$

Condition (6) relates to the amount of displacement of the aspheric third surface. If this condition is not satisfied, it becomes difficult to effectively compensate for coma and distortion under a wide visual field and a low magnification condition.

In the zoom finder of the present invention, the parallel planar plate has an optical frame on one surface that indicates the imaging range. The parallel planar plate is moved in a direction perpendicular to the optical axis to permit easy compensation for parallax since only the frame which indicates the imaging range needs to be moved within the visual field of the finder.

Two examples of the present invention are described below with reference to data tables, wherein $\alpha$ designates a surface number counting from the object side, $R_\alpha$ is the radius of curvature of the $\alpha$th surface, $d_\alpha$ is the distance from the $\alpha$th surface to the $(\alpha+1)$th surface, $n_\beta$ ($\beta$ is a subscript designating the optical material used) denotes the refractive index at the d-line, * denotes an aspheric surface, $f_3$ is the focal length of the third lens, $f_4$ is the focal length of the fourth lens, and EYE POINT indicates the image side of the finder.

EXAMPLE 1

| Surface No.,$\alpha$ | Curvature radius, $R_\alpha$ | Axial surface spacing, $d_\alpha$ | Refractive index, $n_\beta$ | Abbe number, $\nu_\beta$ |
|---|---|---|---|---|
| *1 | 24.256 | 5.157 | 1.49186 | 57.4 |
| *2 | −42.915 | $d_2$ | | |
| *3 | −22.352 | 1.400 | 1.49186 | 57.4 |
| *4 | 10.308 | $d_4$ | | |
| *5 | −53.776 | 1.000 | 1.49186 | 57.4 |
| 6 | 33.029 | 9.235 | | |
| 7 | ∞ | 0.500 | 1.49186 | 57.4 |
| 8 | ∞ | 0.500 | | |
| 9 | 35.034 | 1.518 | 1.49186 | 57.4 |
| 10 | −29.432 | 11.000 | | |
| EYE POINT | | | | |

In Example 1, the sixth surface serves as a half mirror, while the seventh surface is equipped with an optical frame.

| COEFFICIENT OF ASPHERIC SURFACE | | | | | |
|---|---|---|---|---|---|
| Surface No.$\alpha$ | K | $A_4$ | $A_6$ | $A_8$ | $A_{10}$ |
| 1 | −0.17790 | $-2.90187 \times 10^{-6}$ | $1.11976 \times 10^{-8}$ | $5.17127 \times 10^{-10}$ | $-2.78881 \times 10^{-12}$ |
| 2 | −112.403 | $-3.69808 \times 10^{-5}$ | $3.69766 \times 10^{-7}$ | $-1.17404 \times 10^{-9}$ | $7.51071 \times 10^{-13}$ |
| 3 | −96.5595 | $-1.76477 \times 10^{-4}$ | $3.54923 \times 10^{-6}$ | $-2.39254 \times 10^{-8}$ | $5.65043 \times 10^{-11}$ |
| 4 | −0.47700 | $3.02017 \times 10^{-4}$ | $-7.44094 \times 10^{-6}$ | $1.70802 \times 10^{-7}$ | $5.98925 \times 10^{-10}$ |
| 5 | 76.15020 | $4.66821 \times 10^{-5}$ | $6.65103 \times 10^{-6}$ | $-9.15617 \times 10^{-8}$ | $2.25245 \times 10^{-9}$ |

| Finder Magnification | $d_2$ | $d_4$ |
|---|---|---|
| 0.487 | 0.676 | 13.513 |
| 0.896 | 7.632 | 2.464 | where: $f_1 = 32.325$
$f_2 = -14.143$
$f_3 = -41.443$
$f_4 = 32.773$

-continued
COEFFICIENT OF ASPHERIC SURFACE

LDt = 29.406
$f_1/LDt$ = 1.099
$|f_2|/LDt$ = 0.481
$R3/R2$ = 0.521

EXAMPLE 2

| Surface No. $\alpha$ | Curvature radius, R$\alpha$ | Axial surface spacing d$_\alpha$ | Refractive index, n$_\beta$ | Abbe number, $\nu_\beta$ |
|---|---|---|---|---|
| *1 | 17.092 | 6.064 | 1.49186 | 57.4 |
| *2 | −80.832 | d$_2$ | | |
| *3 | −22.152 | 1.400 | 1.49186 | 57.4 |
| *4 | 7.293 | d$_4$ | | |
| *5 | −179.056 | 1.000 | 1.49186 | 57.4 |
| 6 | 33.414 | 9.360 | | |
| 7 | ∞ | 0.500 | 1.49186 | 57.4 |
| 8 | ∞ | 0.450 | | |
| *9 | 21.500 | 1.435 | 1.49186 | 57.4 |
| 10 | −63.118 | 10.000 | | |
| EYE POINT | | | | |

In Example 2, the sixth surface serves as a half mirror, while the seventh surface is equipped with an optical frame.

COEFFICIENT OF ASPHERIC SURFACE

| Surface No. $\alpha$ | K | A$_4$ | A$_6$ | A$_8$ | A$_{10}$ |
|---|---|---|---|---|---|
| 1 | −0.75969 | −1.34854 × 10$^{-5}$ | 8.30418 × 10$^{-9}$ | 2.92583 × 10$^{-9}$ | −1.40754 × 10$^{-11}$ |
| 2 | −351.146 | −6.15704 × 10$^{-5}$ | 9.40569 × 10$^{-7}$ | −5.03263 × 10$^{-9}$ | 8.44372 × 10$^{-12}$ |
| 3 | −0.54508 | 6.25642 × 10$^{-5}$ | 2.48782 × 10$^{-6}$ | −2.43062 × 10$^{-8}$ | 6.81180 × 10$^{-11}$ |
| 4 | −2.56267 | −2.92764 × 10$^{-5}$ | 3.99482 × 10$^{-5}$ | −1.20998 × 10$^{-6}$ | 2.15666 × 10$^{-8}$ |
| 5 | 92.3758 | −1.41267 × 10$^{-4}$ | 1.43477 × 10$^{-5}$ | −1.79426 × 10$^{-7}$ | 1.22857 × 10$^{-9}$ |
| 9 | 0.03788 | 0 | 0 | −6.86433 × 10$^{-8}$ | 0 |

| Finder Magnification | d$_2$ | d$_4$ |
|---|---|---|
| 0.470 | 1.005 | 12.786 |
| 1.052 | 8.400 | 2.367 | where: $f_1$ = 29.282
$f_2$ = −10.983
$f_3$ = −57.162
$f_4$ = 32.789
LDt = 30.976
$f_1/LDt$ = 0.945
$|f_2|/LDt$ = 0.355
$R3/R2$ = 0.329

FIGS. 1–5 depict Example 1 of the present invention as set forth above. FIG. 1 shows a vertical section of the zoom finder according to Example 1 under wide visual field and low magnification conditions. Positive lens 10 is closest to the object side and is movable along the optical axis. Negative lens 20 is also movable along the optical axis. The zoom finder effects zooming by moving lenses 10 and 20 along the optical axis. Negative lens 30 is fixed and has a surface on the eye-side which serves as a half mirror. Parallel planar plate 40 is movable in a direction perpendicular to the optical axis. Additionally, one surface of the parallel planar plate 40 has an optical frame which indicates the imaging range. The zoom finder compensates for parallax by moving lens 40 in the direction perpendicular to the optical axis. Positive lens 50 is closest to the eye-side and is fixed.

The specifications for the lenses 10, 20, 30 and 50 and plate 40 are given in the charts for Example 1 set forth above. The surface number $\alpha$ in the charts ranges from 1–10 where 1 is the surface closest to the object side and 10 is the surface closest to the eye-side as shown in FIG. 1.

Figure 2:
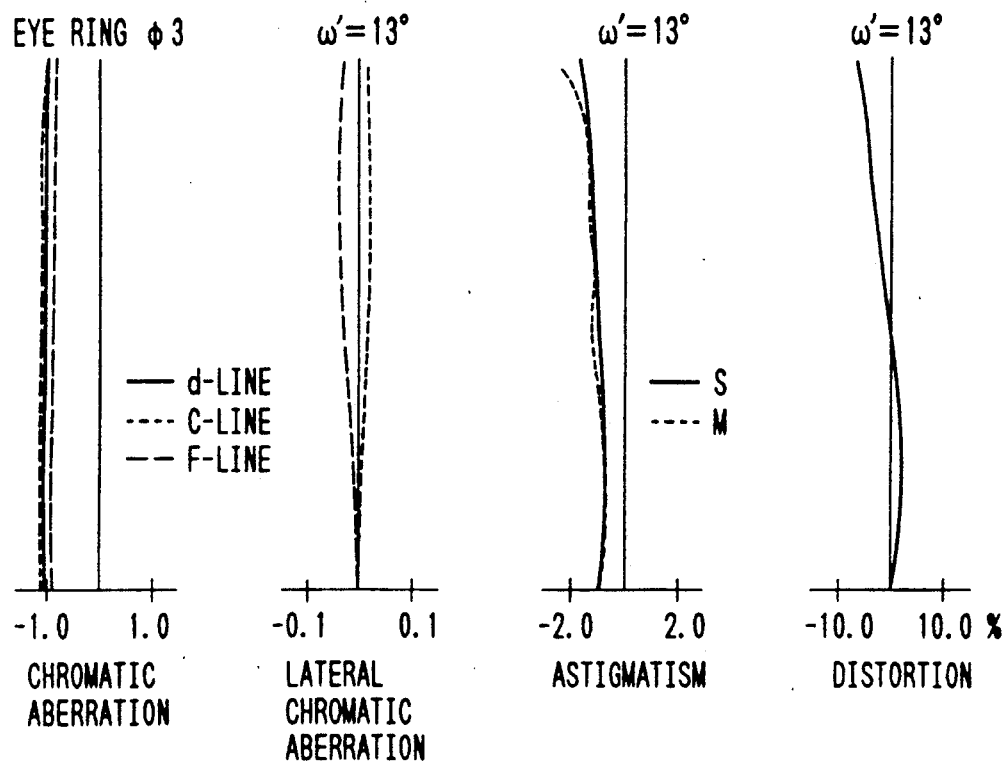
FIG. 2 is a graph plotting aberration curves for the zoom finder of FIG. 1.

FIG. 2 is a graph plotting various aberration curves for the zoom finder shown in FIG. 1.

Figure 3:
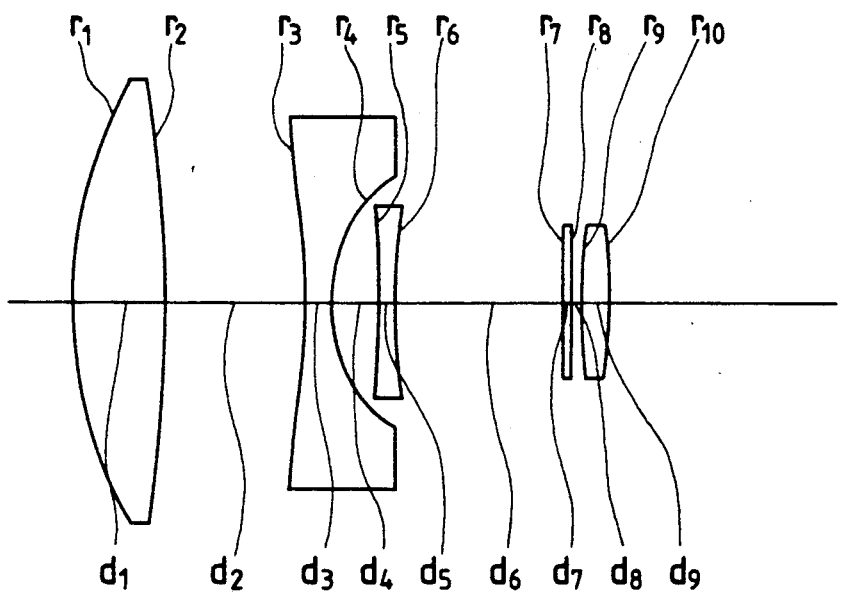
FIG. 3 shows a vertical section of a zoom finder according to the first embodiment of the present invention shown by Example 1 under narrow visual field and high magnification conditions.

FIG. 3 shows a vertical section of the zoom finder according to Example 1 under narrow visual field and high magnification conditions. The elements shown in FIG. 3 are the same as those shown in FIG. 1 but are positioned differently due to the different visual field and magnification conditions. FIG. 4 is a graph plotting various aberration curves for the zoom finder shown in FIG. 3. FIG. 5 is a graph plotting various aberration curves obtained using an Albada finder according to Example 1.

Figure 6:
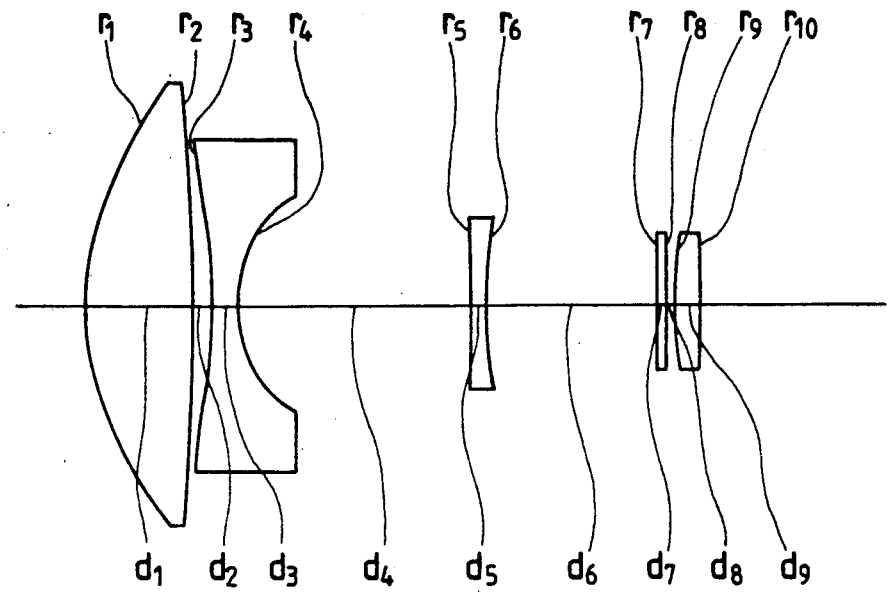
FIG. 6 shows a vertical section of a zoom finder according to a second embodiment of the present invention shown in Example 2 under wide visual field and low magnification conditions.
Figure 7:
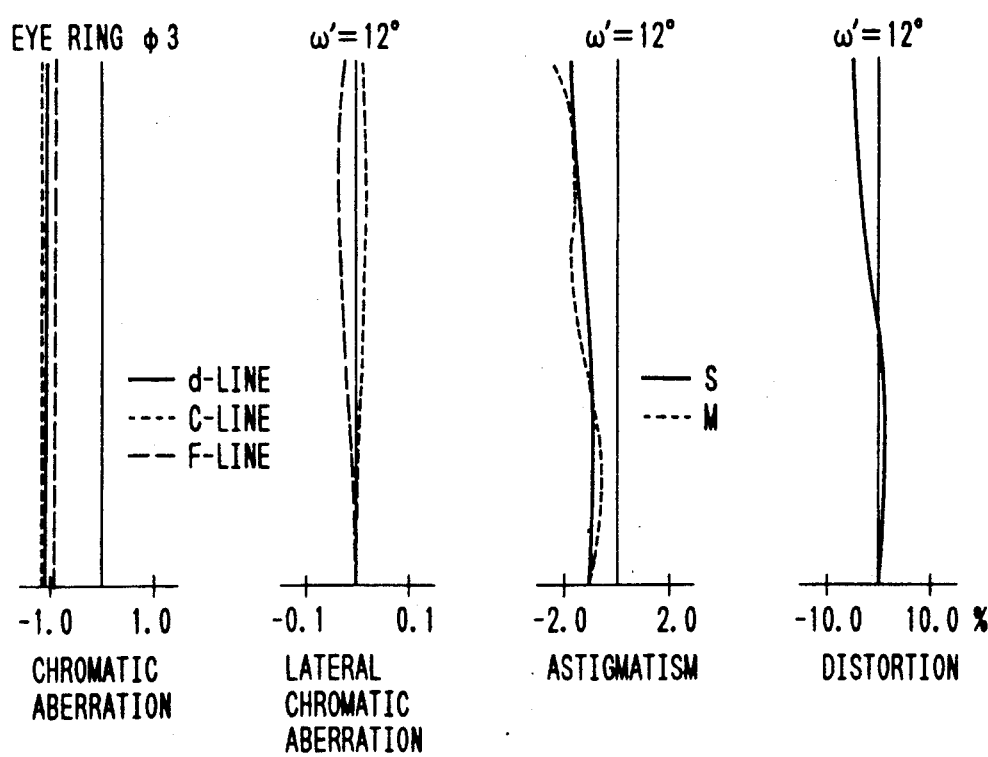
FIG. 7 is a graph plotting aberration curves for the zoom finder of FIG. 6.
Figure 8:
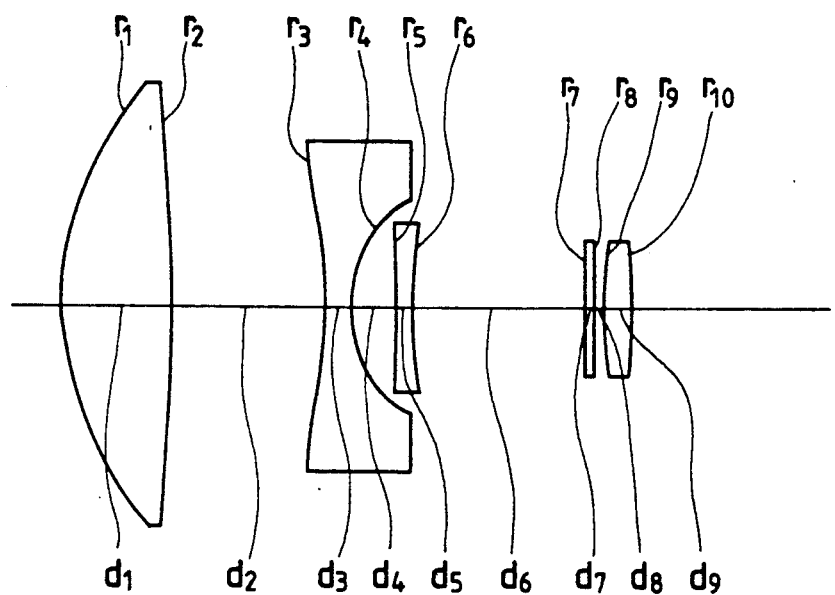
FIG. 8 shows a vertical section of a zoom finder according to the second embodiment of the present invention shown by Example 2 under narrow visual field and high magnification conditions.

FIGS. 6–10 depict Example 2 of the present invention as set forth above. FIGS. 6 and 8 show a vertical section of the zoom finder according to Example 2 under wide visual field and low magnification conditions, and under narrow visual field and high magnification conditions, respectively. Lenses, 60, 70, 80 and 100 and parallel planar plate 90 correspond to lenses 10, 20, 30 and 50 and plate 40 of FIGS. 1 and 3, respectively. Lenses 60, 70, 80 and 100 and plate 90 have the specifications given in the charts for Example 2 set forth above.

Figure 9:
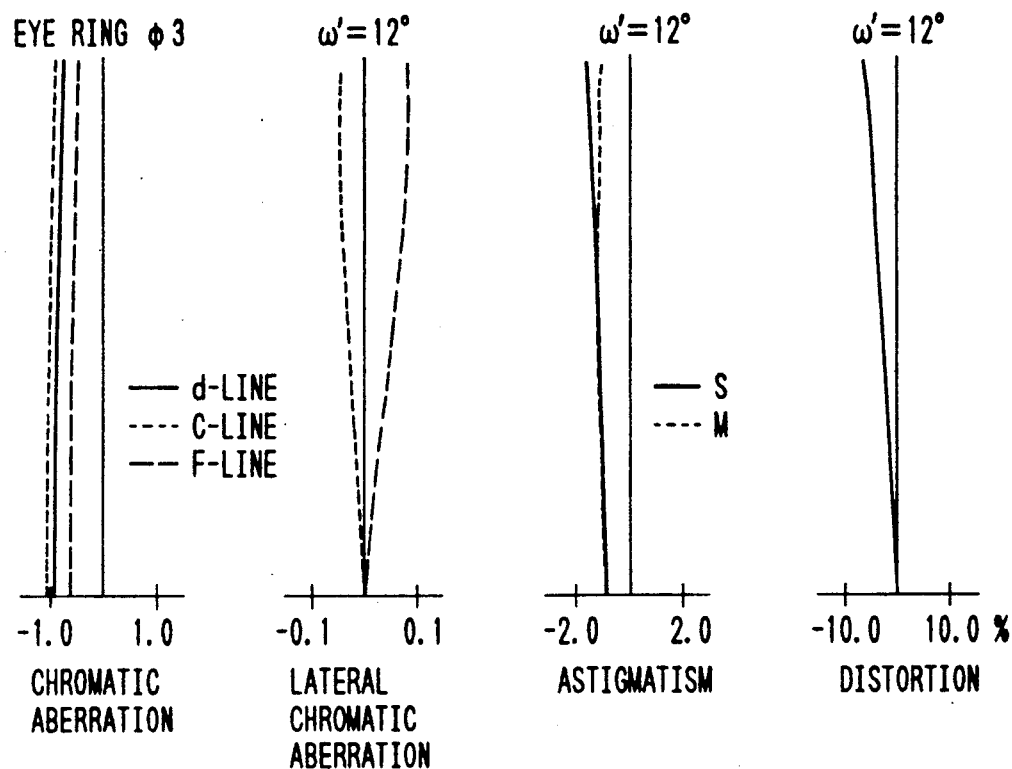
FIG. 9 is a graph plotting aberration curves for the zoom finder of FIG. 8.
Figure 10:
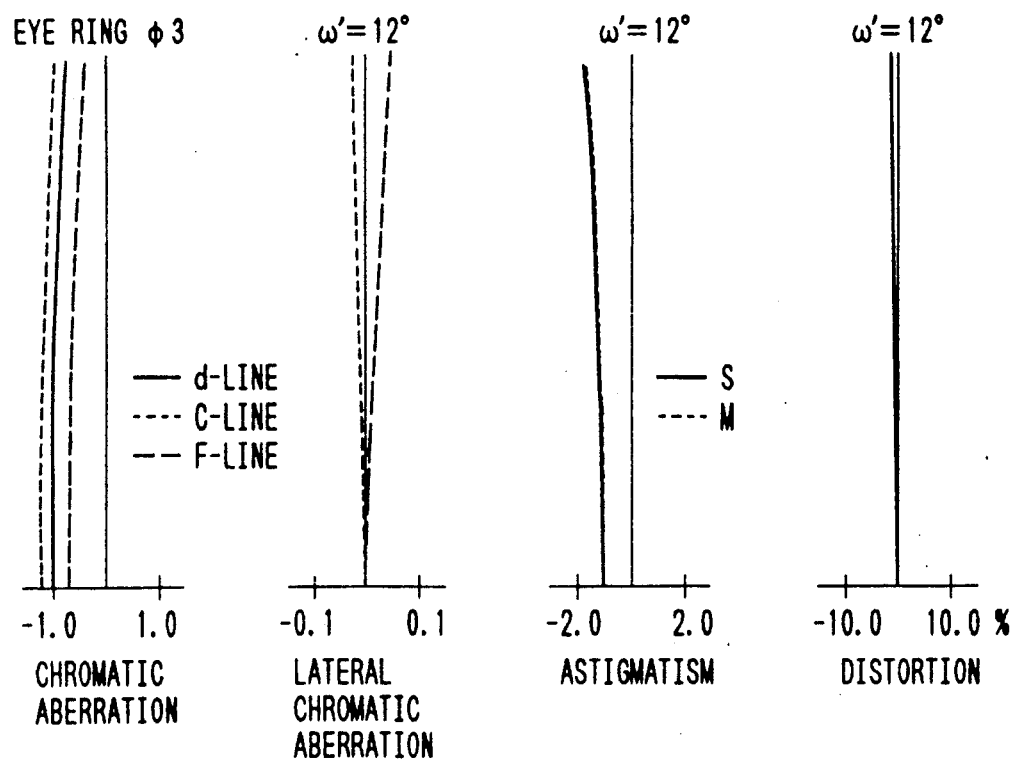
FIG. 10 is a graph plotting aberration curves obtained with an Albada finder according to the second embodiment of the present invention shown by Example 2.

FIGS. 7 and 9 are graphs plotting various aberration curves for the zoom finder of FIGS. 6 and 8, respectively. FIG. 10 is a graph plotting various aberration curves obtained using an Albada finder according to Example 2.

As described above, the zoom finder of the present invention is simple in construction. However, by satisfying conditions (1)–(5) (and preferably conditions (1)–(6)), this zoom finder achieves efficient compensation for aberrations and satisfactory view-finding in spite of its compactness and ability to provide high magnification.

The zoom finder of the present invention also insures easy compensation for parallax by moving the parallel planar plate in a direction perpendicular to the optical axis.

What is claimed:

1. A zoom finder comprising, in order from an object side:
   a positive first lens movable along an optical axis;
   a negative second lens movable along said optical axis;
   a negative third lens having an eye-side surface which serves as a half mirror;
   a parallel planar plate movable in a direction perpendicular to said optical axis and having an optical frame on one surface which indicates an imaging range; and
   a positive fourth lens,
   said zoom finder further satisfying the condition that:
   $0.1 < R3/R2 < 0.9$, where:
   R2 is the paraxial radius of curvature of the second surface from the object side; and
   R3 is the paraxial radius of curvature of the third surface from the object side.

2. A zoom finder as claimed in claim 1, wherein said zoom finder effects zooming by moving said first and second lenses along said optical axis.

3. A zoom finder as claimed in claim 1, wherein said zoom finder compensates for parallax by moving said parallel planar plate in a direction perpendicular to said optical axis.

4. A zoom finder as claimed in claim 1, said zoom finder further satisfying the following conditions:

$0.5 < f_1/LDt < 1.5$;
$0.1 < |f_2|/LDt < 0.7$;
$R2 < 0$; and
$R3 < 0$;

where:
   $f_1$ is the focal length of the first lens;
   $f_2$ is the focal length of the second lens; and
   LDt is the overall lens length under narrow visual field and high magnification conditions.

5. A zoom finder as claimed in claim 4, wherein a surface of the second lens which is on the object side is an aspheric surface and satisfies the following condition:

$0.003 < \Delta X_3(0.2LDt)/LDt < 0.05$;

where $\Delta X$ is an amount of displacement of said aspheric surface, and a geometry of said aspheric surface is given by:

$$\Delta X_\alpha(H) = \frac{H^2/R}{1 + \sqrt{1 - (K+1) \cdot H^2/R^2}} +$$

$$\sum_{i=2}^{5} A_{2i} \cdot H^{2i} - \frac{H^2/R}{1 + \sqrt{1 - H^2/R^2}}$$

where:
   $\alpha$ is the subscript designating a refractive surface;
   H is the height from the optical axis;
   K is the coefficient of a second-order curved surface;
   R is a paraxial radius of curvature; and
   $A_{2i}$ is the coefficient of a higher order aspheric surface.

6. A zoom finder as claimed in claim 1, wherein at least one of said lenses is an aspheric lens.

7. A zoom finder as claimed in claim 1, wherein said third lens and said fourth lens are fixed.

8. A zoom finder as claimed in claim 1, wherein said zoom finder has a leaf-shutter.

9. A zoom finder as claimed in claim 1, wherein each of said lenses is a single lens element.

10. A zoom finder as claimed in claim 1, satisfying the following tables, wherein wherein $\alpha$ designates a surface number counting from the object side, $R_\alpha$ is the radius of curvature of the $\alpha$th surface, $d_\alpha$ is the distance from the $\alpha$th surface to the $(\alpha+1)$th surface, $n_\beta$ ($\beta$ is a subscript designating the optical material used) denotes the refractive index at the d-line, * denotes an aspheric surface, $f_3$ is the focal length of the third lens, $f_4$ is the focal length of the fourth lens, and EYE POINT indicates the image side of the finder:

| Surface No. $\alpha$ | Curvature radius, $R\alpha$ | Axial surface spacing $d_\alpha$ | Refractive index, $n_\beta$ | Abbe number, $\nu_\beta$ |
|---|---|---|---|---|
| *1 | 24.256 | 5.157 | 1.49186 | 57.4 |
| *2 | −42.915 | $d_2$ | | |
| *3 | −22.352 | 1.400 | 1.49186 | 57.4 |
| *4 | 10.308 | $d_4$ | | |
| *5 | −53.776 | 1.000 | 1.49186 | 57.4 |
| 6 | 33.029 | 9.235 | | |
| 7 | ∞ | 0.500 | 1.49186 | 57.4 |
| 8 | ∞ | 0.500 | | |
| 9 | 35.034 | 1.518 | 1.49186 | 57.4 |
| 10 | −29.432 | 11.000 | | |
| EYE POINT | | | | |

| COEFFICIENT OF ASPHERIC SURFACE | | | | | |
|---|---|---|---|---|---|
| $\alpha$ | K | $A_4$ | $A_6$ | $A_8$ | $A_{10}$ |
| 1 | −0.17790 | −2.90187 × $10^{-6}$ | 1.11976 × $10^{-8}$ | 5.17127 × $10^{-10}$ | −2.78881 × $10^{-12}$ |
| 2 | −112.403 | −3.69808 × $10^{-5}$ | 3.69766 × $10^{-7}$ | −1.17404 × $10^{-9}$ | 7.51071 × $10^{-13}$ |
| 3 | −96.5595 | −1.76477 × $10^{-4}$ | 3.54923 × $10^{-6}$ | −2.39254 × $10^{-8}$ | 5.65043 × $10^{-11}$ |
| 4 | −0.47700 | 3.02017 × $10^{-4}$ | −7.44094 × $10^{-6}$ | 1.70802 × $10^{-7}$ | 5.98925 × $10^{-10}$ |
| 5 | 76.15020 | 4.66821 × $10^{-5}$ | 6.65103 × $10^{-6}$ | −9.15617 × $10^{-8}$ | 2.25245 × $10^{-9}$ |

| Finder Magnification | $d_2$ | $d_4$ |
|---|---|---|
| 0.487 | 0.676 | 13.513 |
| 0.896 | 7.632 | 2.464 | wherein the sixth surface serves as a half mirror, while the seventh surface is equipped with an optical frame, and wherein:

$f_1 = 32.325$
$f_2 = -14.143$
$f_3 = -41.443$
$f_4 = 32.773$
$LDt = 29.406$
$f_1/LDt = 1.099$
$|f_2|/LDt = 0.481$

R3/R2=0.521.

11. A zoom finder as claimed in claim 1, satisfying the following tables, wherein wherein $\alpha$ designates a surface number counting from the object side, $R_\alpha$ is the radius of curvature of the $\alpha$th surface, $d_\alpha$ is the distance from the $\alpha$th surface to the $(\alpha+1)$th surface, $n_\beta$ ($\beta$ is a subscript designating the optical material used) denotes the refractive index at the d-line, * denotes an aspheric surface, $f_3$ is the focal length of the third lens, $f_4$ is the focal length of the fourth lens, and EYE POINT indicates the image side of the finder:

| Surface No. $\alpha$ | Curvature radius, $R_\alpha$ | Axial surface spacing $d_\alpha$ | Refractive index, $n_\beta$ | Abbe number, $\nu_\beta$ |
|---|---|---|---|---|
| *1 | 17.092 | 6.064 | 1.49186 | 57.4 |
| *2 | −80.832 | $d_2$ | | |
| *3 | 22.152 | 1.400 | 1.49186 | 57.4 |
| *4 | 7.293 | $d_4$ | | |
| *5 | −179.056 | 1.000 | 1.49186 | 57.4 |
| 6 | 33.414 | 9.360 | | |
| 7 | ∞ | 0.500 | 1.49186 | 57.4 |
| 8 | ∞ | 0.450 | | |
| *9 | 21.500 | 1.435 | 1.49186 | 57.4 |
| 10 | −63.118 | 10.000 | | |
| EYE POINT | | | | |

| COEFFICIENT OF ASPHERIC SURFACE | | | | | |
|---|---|---|---|---|---|
| $\alpha$ | K | $A_4$ | $A_6$ | $A_8$ | $A_{10}$ |
| 1 | −0.75969 | $-1.34854 \times 10^{-5}$ | $8.30418 \times 10^{-9}$ | $2.92583 \times 10^{-9}$ | $-1.40754 \times 10^{-11}$ |
| 2 | −351.146 | $-6.15704 \times 10^{-5}$ | $9.40569 \times 10^{-7}$ | $-5.03263 \times 10^{-9}$ | $8.44372 \times 10^{-12}$ |
| 3 | −0.54508 | $6.25642 \times 10^{-5}$ | $2.48782 \times 10^{-6}$ | $-2.43062 \times 10^{-8}$ | $6.81180 \times 10^{-11}$ |
| 4 | −2.56267 | $-2.92764 \times 10^{-5}$ | $3.99482 \times 10^{-5}$ | $-1.20998 \times 10^{-6}$ | $2.15666 \times 10^{-8}$ |
| 5 | 92.3758 | $-1.41267 \times 10^{-4}$ | $1.43477 \times 10^{-5}$ | $-1.79426 \times 10^{-7}$ | $1.22857 \times 10^{-9}$ |
| 9 | 0.03788 | 0 | 0 | $-6.86433 \times 10^{-8}$ | 0 |

| Finder magnification | $d_2$ | $d_4$ |
|---|---|---|
| 0.470 | 1.005 | 12.786 |
| 1.052 | 8.400 | 2.367 | wherein the sixth surface serves as a half mirror, while the seventh surface is equipped with an optical frame, and wherein:

$f_1 = 29.282$
$f_2 = -10.983$
$f_3 = -57.162$
$f_4 = 32.789$
LDt = 30.976
$f_1/$LDt = 0.945
$|f_2|/$LDt = 0.355
R3/R2 = 0.329.

* * * * *